March 3, 1931. F. W. PETERS 1,795,264
UNIVERSAL JOINT
Filed July 14, 1927 2 Sheets-Sheet 1
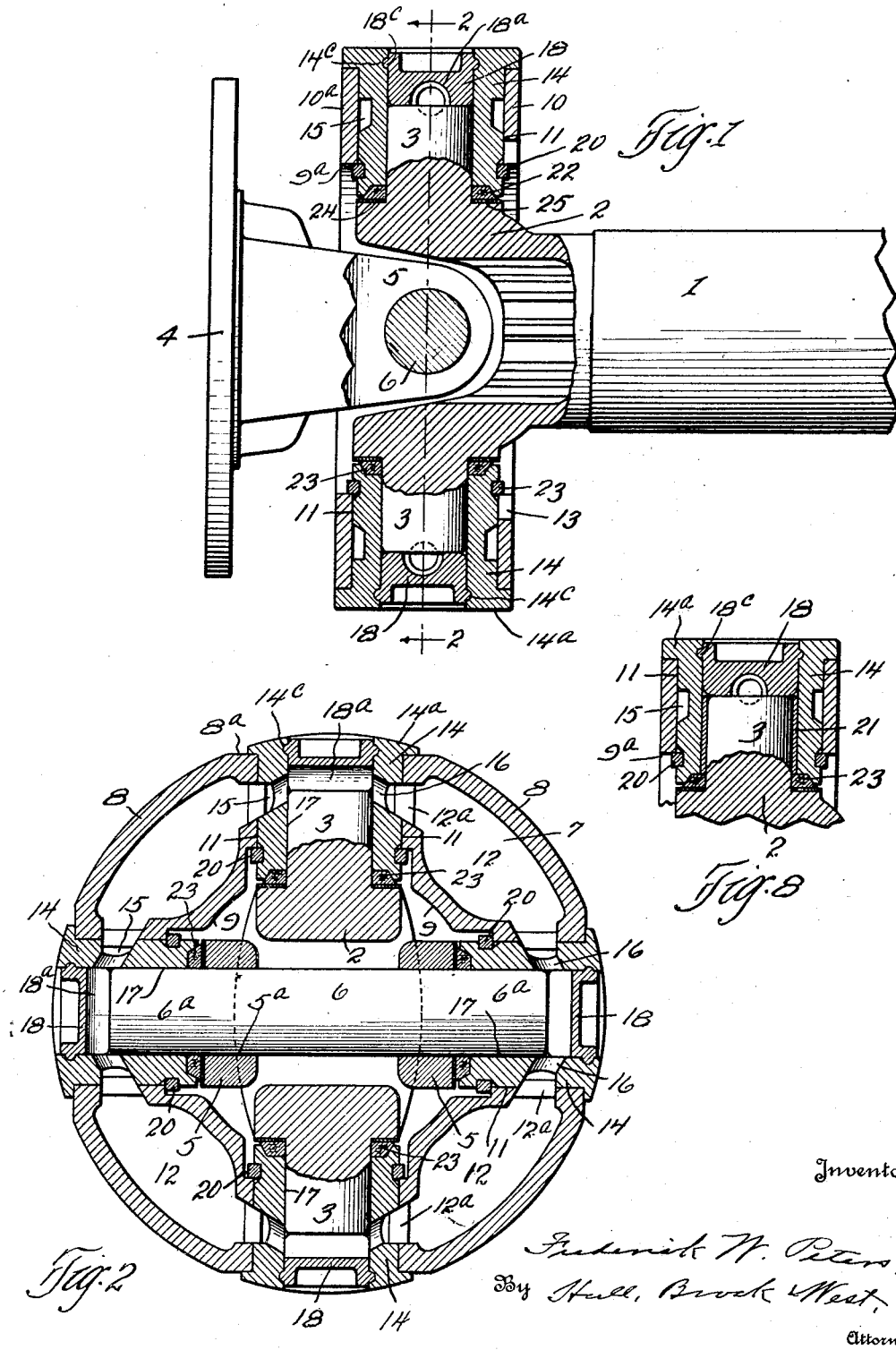

March 3, 1931. F. W. PETERS 1,795,264
UNIVERSAL JOINT
Filed July 14, 1927 2 Sheets-Sheet 2
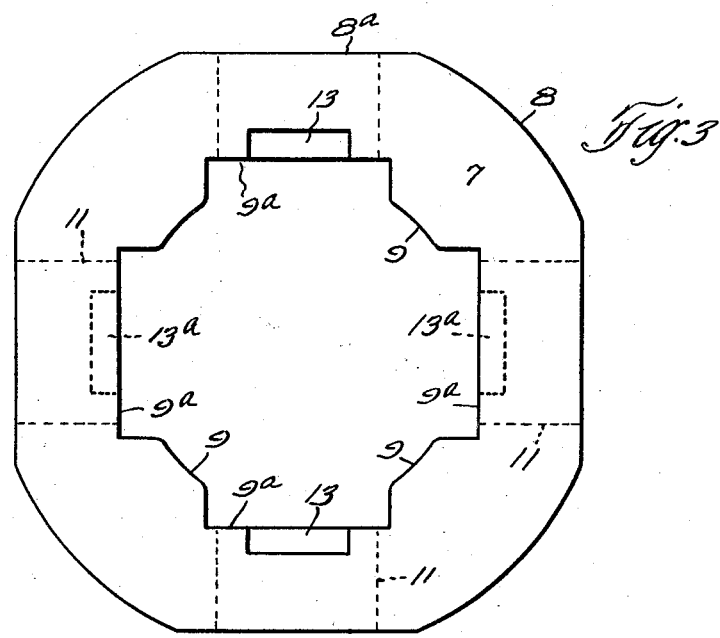
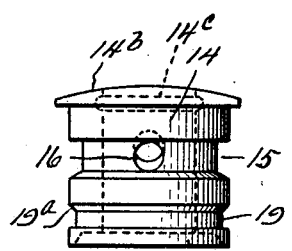
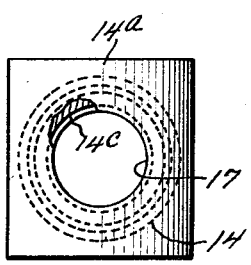
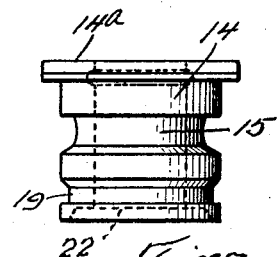
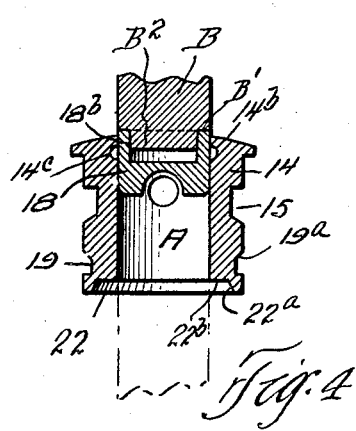
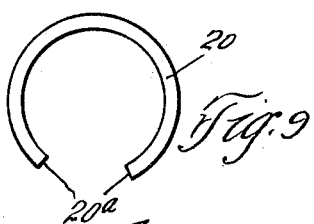
Inventor
Frederick W. Peters,
By Hull, Brock & West,
Attorney Patented Mar. 3, 1931

1,795,264

UNITED STATES PATENT OFFICE

FREDERICK W. PETERS, OF CLEVELAND, OHIO, ASSIGNOR TO THE ALMETAL UNIVERSAL JOINT COMPANY, OF CLEVELAND, OHIO, A CORPORATION OF OHIO

UNIVERSAL JOINT

Application filed July 14, 1927. Serial No. 205,603.

This invention relates to universal joints, and more particularly to joints of the type wherein a hollow lubricant-containing connecting ring is employed as a means for coupling trunnions carried by driving and driven members.

It is the general purpose and object of the invention to provide a joint of this character with a novel construction and arrangement of trunnion-receiving bushings which will not only facilitate the assembling operation, but which will enable lubricant to be supplied from the ring in an efficient manner to the trunnions.

A still further object of the invention is to provide for joints of this character an improved construction of trunnion-receiving bushings and end-thrust blocks; also to construct such bushings and end-thrust blocks in such manner as to permit lubricant to be supplied efficiently to the interior of the bushings and to the trunnions therein. A still further object of the invention is to provide cheap and efficient means for securing the bushings in place.

The foregoing objects will be accomplished in and through the construction and arrangement of parts shown in the drawings, wherein Fig. 1 represents a central sectional view through a joint constructed in accordance with my invention, certain parts being shown in elevation; Fig. 2 a sectional view corresponding substantially to the line 2—2 of Fig. 1; Fig. 3 a side elevation of the connecting ring; Fig. 4 a detail in section showing one of the bushings and the manner of inserting an end thrust block therein; Fig. 5 is a plan view of one of the bushings; Figs. 6 and 7 elevations, taken at right angles to each other, of one of said bushings; Fig. 8 a detail in section through out of the bushings and showing the end thrust block, trunnion, and side walls of the ring, together with a non-freezing lining for the bushing; and Fig. 9 a plan view of one of the locking rings for the bushings.

Describing the parts by reference characters, 1 represents the hub of one of the members to be connected, the same being provided with a yoke 2 having integral trunnions 3. 4 denotes a flange on the other member and 5 short yoke arms carried by said flange and provided each with a bore $5^a$ for the reception of a cross pin 6, the ends $6^a$ whereof constitute trunnions. The connecting ring for the trunnions (indicated generally at 7), is provided with the outer cylindrical surfaces 8 and the corresponding inner cylindrical surfaces 9. Between adjacent outer cylindrical surfaces, the ring is flattened, as shown at $8^a$, and between adjacent inner cylindrical surfaces 9, the ring is provided with outwardly projecting recesses, each having a flattened surface $9^a$. The centers of the surfaces $8^a$ are arranged 90° apart and the same is true of the surface $9^a$. The ring is provided with opposite sides 10 and $10^a$.

From each of the surfaces $8^a$, a radial bore 11 extends inwardly through the corresponding inner face $9^a$ of the ring. Between adjacent bores, the ring is provided with chambers 12 for lubricant, each chamber being provided with ports $12^a$ at the opposite ends thereof, communicating with the bores 11.

It will be noted, from an inspection of Figs. 1, 2 and 3, that the side 10 of the ring is provided with outwardly extending notches 13 and that the side $10^a$ is also provided with outwardly extending notches $13^a$, the notches constituting radial outward extensions of the corresponding sides of the recesses $9^a$, the notches intersecting the bores 11 and the centers of the notches 13 being located 90° from the centers of the notches $13^a$. The notches 13 and $13^a$ are of sufficient width to permit the passage therethrough of the trunnions 3 and $6^a$, thereby facilitating the assembling of the trunnions in their cooperating bores 11.

In each bore is mounted a bushing 14, each such bushing having a head $14^a$. The head of each bushing is provided with an outer cylindrical surface $14^b$ having the same curvature as the cylindrical surface 8 whereby, when the said bushings are properly positioned within their respective bores 11, their outer surfaces constitute each a continuation of the cylindrical surfaces 8. Each head rests upon the flattened seat $8^a$ provided therefor. Each bushing is provided with a groove 15 extending therearound and forming an annular distributing chamber with the interior of the bore 11, there being ports 16 extending through the grooved portion of the bushing and preferably converging toward the centers of the outer portions of their respective bores 17, at the angle indicated, the inner ends of the ports communicating with the chamber provided within the outer portion of the bore 17 of the bushing, four such ports being shown.

The bores 17 are of a size to receive snugly therewithin their respective trunnions, and the groves 15 and ports 16 are so arranged that the lubricant within the chamber 12 will be delivered by centrifugal action through the ports and the chambers provided beyond the ends of the said trunnions.

Within the outer end of the bore of each bushing there is mounted a thrust block 18, each block having a cupped outer end and being provided at its inner end with an outwardly projecting groove 18$^a$ extending diametrically thereacross. The inner ends of these thrust blocks are adapted to be engaged by the outer ends of the trunnions and are anchored in place in the manner shown in Fig. 4. As will be seen from this view and Figs. 1, 2 and 8, each bushing is provided, within the outer end thereof, with an outwardly extending annular groove 14$^c$. The flanbe 18$^b$ at the outer end of each thrust block is of such length that, when each such block is inserted to its proper depth in the outer end of the bushing bore, the said flange will project beyond the outer end of the bushing. The thrust block being supported at its inner end in proper position within the bore of its bushing as shown at A, an upsetting tool B is applied to the flange of the thrust block, the said tool having an annular thrust surface B′, adapted to engage the said flange and a reduced extension B$^2$ adapted to engage the inner face of the flange whereby, on moving the tool B inwardly with respect to the bore of the bushing, the flange will be caused to expand outwardly into the recess 14$^c$, thus forming an annular rib 18$^c$ filling the said recess and anchoring the block in place. The dimensions are preferably such that, at the end of the upsetting operation, the block will be countersunk slightly within the outer end of the bore of the bushing. In this operation of applying the thrust block to the bushing, care will be taken to align the recess 18$^a$ with the inner ends of the ports 16 so that lubricant may flow through the said ports and the said recess 18$^a$ by centrifugal action.

In order to anchor each bushing in place, I provide the same with an annular recess 19, which recess will, when the bushing is assembled in the ring, extend inwardly beyond the inner walls 9$^a$ thereof. The outer wall of each recess is beveled, as shown at 19$^a$, to prevent cutting the wall of the bore 11 which receives the bushing, as the latter is inserted in place within such bore. Each recess 19 is adapted to receive a locking device 20, the same being made of spring metal and in the shape of the segment of a ring of more than 180° extent, the ends 20$^a$ being spaced a sufficient distance to enable them to be sprung apart so that the device may be forced across the appropriate grooves 19 until seated therein, the said devices closing by their own resiliency and anchoring the bushings in place, with the outer face of each device engaging a wall 9$^a$.

While the bushings and trunnions described hereinbefore are intended to be used in connection with a joint having a lubricant-containing ring, it sometimes happens that the lubricant becomes exhausted or that, for other reasons, the trunnions are not lubricated properly within their bushings, with the result that a "galling" or "freezing" action takes place between the trunnions and the bushings. In order to prevent this undesirable action, I press into the inner end of the bore of each bushing a lining 21, the said lining being composed principally of bronze and preferably of a combination of graphite and bronze known to the trade as "graphite bronze". This lining surrounds the trunnion pin within the bushing and extends outwardly as far as the thrust block 18.

The inner end of each bushing is shown as provided with a recess 22 extending radially outwardly from the inner end of the bore thereof as well as outwardly from the bottom thereof, each recess having an inclined side wall 22$^a$. This recess receives packing material 23, and this packing material is thrust into the recess, not only by the pressure exerted between the bottom wall 22$^b$ of such recess and the shoulder 24 at the base of the trunnion but also by a washer 25 which rests on said shoulder and which is preferably of the frusto-conical spring metal type described and claimed in my Patent No. 1,621,216, granted March 15, 1927. The structure and arrangement of the parts 22—25 inclusive provides an efficient means for preventing leakage of lubricant supplied to the trunnions and to the bores of the bushings.

In assembling, the integral trunnions on the yoke 2 are inserted through the opening 13 by tilting the ring so that one of the trunnions may be inserted within the large bore 11 extending from such recess. By slipping the ring along the trunnion thus inserted as far as conveniently possible and by tilting the opposite side of the ring, the other trunnion 3 may be inserted through its recess 13 and positioned within its bore 11, after which the bushings, together with their bearing blocks, may be inserted within the bores. The yoke on the opposite member can be inserted into the interior of the ring even without using the recesses 13 on such side. When the openings in the yoke are lined with the proper bores in the ring the pin 6 may be inserted, after which the bushings, together with their thrust blocks, may be applied to the bores and to the ends of the pin.

Having thus described my invention, what I claim is:

1. In a universal joint, the combination of a driving and a driven member each having trunnions, a connecting ring having quarteringly-spaced radial bores extending therethrough, bushings in said bores each adapted to receive a trunnion and each having a radial bore extending therethrough, and a thrust block mounted in the outer end of each bushing bore, each thrust block having a projection on the outer surface thereof engaging a recess projecting outwardly from the bushing bore.

2. In a universal joint, the combination of a driving and a driven member each having trunnions, a connecting ring having quarteringly-spaced radial bores extending therethrough, bushings in said bores each adapted to receive a trunnion and each having a radial bore extending therethrough, and a thrust block mounted in the outer end of each bushing bore, each thrust block having an annular rib projecting from the outer surface thereof and engaging an annular recess projecting outwardly from the bushing bore.

3. In a universal joint, the combination of a driving and a driven member each having trunnions, a connecting ring having quarteringly-spaced radial bores extending therethrough, bushings in said bores each adapted to receive a trunnion and each having a radial bore extending therethrough, and a thrust block mounted in the outer end of each bushing bore, each thrust block having a cup within the outer end thereof enclosed by a flange and having an outwardly extending annular rib projecting from the outer surface of the said flange and engaging a corresponding groove projecting outwardly from the bore of the bushing.

4. In a universal joint, the combination of a driving and a driven member each having trunnions, a connecting ring having quarteringly-spaced radial bores extending therethrough, bushings in said bores each adapted to receive a trunnion and each having a radial bore extending therethorugh, and a thrust block anchored in the outer end of each bushing bore by means of a circumferential rib expanded therefrom into a circumferential groove projecting outwardly from the bore of the bushing.

5. In a universal joint, the combination of a driving and a driven member each having trunnions, a hollow lubricant-containing connecting ring having quarteringly-spaced radial bores extending therethrough, bushings in said bores each adapted to receive a trunnion and each having a radial bore extending therethrough and ports communicating with said bore and adapted to receive lubricant from said ring, and a thrust block mounted in the outer end of each bushing bore and having its outer end secured within the bushing bore by means of a rib-and-groove connection, the inner end of each such thrust block being provided with a transverse port adapted to register with the ports in the bushing.

6. In a universal joint the combination of a driving and a driven member each having trunnions, a hollow lubricant-containing connecting ring having quarteringly-spaced radial bores extending therethrough, bushings in said bores each adapted to receive a trunnion and each having a radial bore extending therethrough and ports communicating with said bore and adapted to receive lubricant from said ring, and a thrust block mounted in the outer end of each bushing bore, the inner end of each such thrust block being provided with a transverse port adapted to register with the ports in the bushing.

7. In a universal joint, the combination of a driving and a driven member each having trunnions, a connecting ring having quarteringly-spaced radial bores extending therethrough, bushings in said bores each adapted to receive a trunnion and each having a radial bore extending therethrough, and a thrust block mounted in the outer end of each bushing bore, each block having a cupped outer end formed within a flange and locked into the bushing bore by compressing the said flange thereby to form a rib projecting outwardly from the outer wall of such flange and engaging a groove extending outwardly from the corresponding part of the bore of said bushing.

8. In a universal joint, the combination of a driving and a driven member each having trunnions, a connecting ring having quarteringly-spaced radial bores extending therethrough, a bushing mounted in each bore with its inner end projecting radially inwardly beyond the bore provided therefor in said ring, each of said bushings having an annular groove in the outer surface thereof, and a locking device in each groove and adapted to engage the inner face of said ring thereby to retain each bushing in place.

9. In a universal joint, the combination of a driving and a driven member each having trunnions, a connecting ring having quarteringly-spaced radial bores extending therethrough, a bushing mounted in each bore with its inner end projecting radially inwardly beyond the bore provided therefor in said ring, and a locking device applied to the inner end of each such bushing and adapted to engage the inner face of said ring thereby to retain the bushings in place.

10. In a universal joint, the combination of a driving and a driven member each having trunnions, a connecting ring having quarteringly-spaced bores extending therethrough, bushing members in said bores and each having a radial bore extending therethrough for the reception of a trunnion, and a thrust block member mounted in the outer end of the bore of each bushing member and secured therein by means of a rib pressed from one of said members and engaging a groove formed in the other of said members.

In testimony whereof, I hereunto affix my signature.

FREDERICK W. PETERS.